Patented Oct. 21, 1952

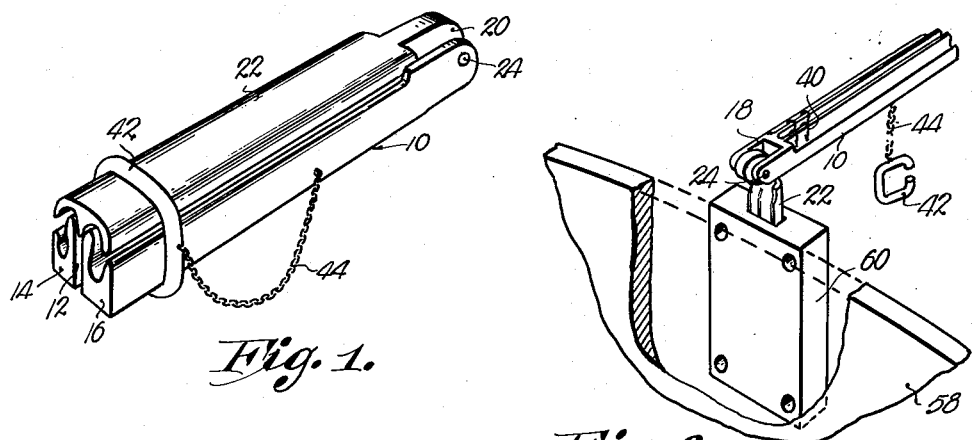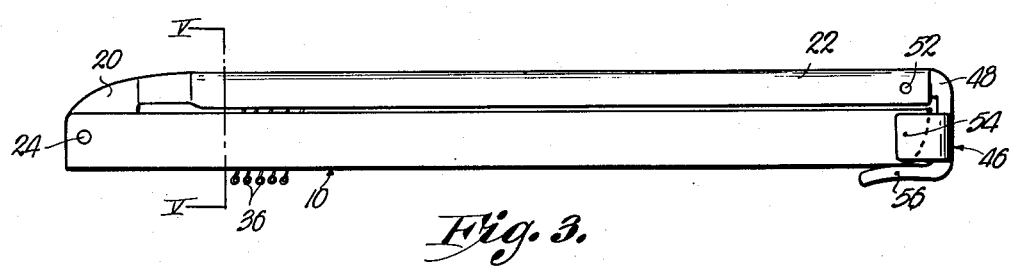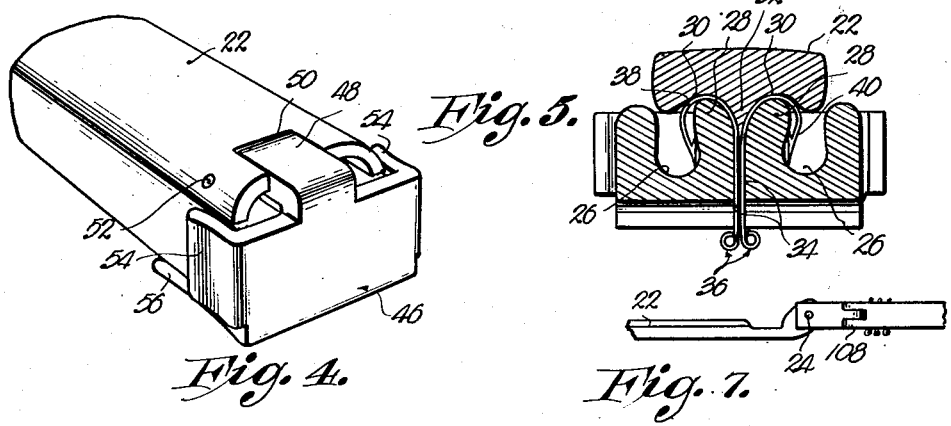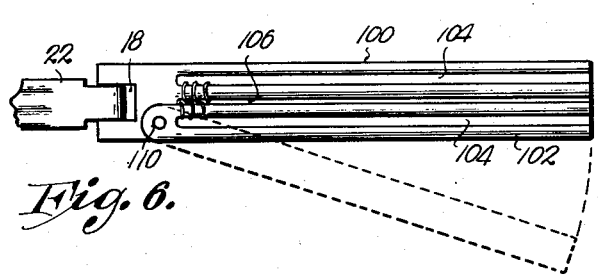
William G. Galbraith
William T. Williams
Clyde T. Abraham
INVENTORS.
BY
ATTORNEY.

2,614,359

UNITED STATES PATENT OFFICE 2,614,359

FISHHOOK RACK

William G. Galbraith, William T. Williams, and Clyde T. Abraham, Kansas City, Mo.

Application July 24, 1950, Serial No. 175,563

2 Claims. (Cl. 43—57.5)

This invention relates to fishing equipment and has to do more particularly with a rack or holder for fishhooks, whether the same are in a separate condition or interconnected through leaders and the like, upon a trotline, the primary object being to present a holder that will permit assembling of the hooks and removal thereof quickly and easily while preventing entanglement.

It is the most important object of the present invention to provide a fishhook holder that is capable of maintaining the hooks positioned as desired, and including means for mounting the hooks in looped relationship to a part of the rack, there being provided a releasable clamp member for holding the hooks tightly against that portion of the rack over which the hooks are looped.

An important object of this invention is to provide a fishhook rack including an elongated body having a slot formed therein for threadably receiving the shanks of the hooks, there being a channel adjacent and parallel to the slot for receiving the arcuate barbed end of the hook for not only protecting the barb but protecting the user of the device.

An additional object of this invention is the provision of a fishhook rack provided with a lid that is adapted to swing to an operable position bearing against the rounded portion of the hook and extending into the slot of the rack, the main body portion of the rack being resilient for receiving said lid.

Other objects of this invention include the way in which a releasable clamp or fixture is provided to hold the lid portion thereof in an operable hook-holding position; and the way in which one section of the rack is made swingable to render any one of the hooks accessible as desired.

In the drawing:

Figure 1 is a perspective view of one form of fishhook rack made pursuant to the present invention showing the same in the closed condition.

Fig. 2 is a perspective view of the rack shown in Fig. 1 with the same open and ready for use.

Fig. 3 is a side elevational view of the rack showing a modified form of latch means.

Fig. 4 is a fragmentary, end, perspective view illustrating more clearly the latch of Fig. 3.

Fig. 5 is a transverse, cross-sectional view taken on line V—V of Fig. 3.

Fig. 6 is a top plan view of a modified form of rack with the lid thereof open; and Fig. 7 is a fragmentary, side elevational view of the rack illustrated in Fig. 6.

As just above indicated, the modification of the present invention shown by Figs. 1 and 2, differs from that illustrated by Figs. 3 to 5 inclusive in the latch means. Accordingly, the designated numerals hereinafter used, will be understood to be common to both of these two forms.

An elongated member broadly designated by the numeral 10, is provided with a substantially central slot 12 extending longitudinally throughout virtually the entire length of the member 10, presenting therefore, a pair of side-by-side parallel, identical sections 14 and 16. One end of the slot 12 is open while the opposite end thereof is closed by a bifurcated end 18 forming an integral part of the body member 10. The furcations of the bifurcated end 18 swingably receive one end 20 of a lid or closure member 22 through the medium of a transverse pin or the like 24.

As shown most clearly in Fig. 5 of the drawing, the sections 14 and 16 are each provided with an elongated channel 26 that are co-extensive in length and parallel with the slot 12. The channels 26 are each separated from the slot 12 by a rib 28 provided with an arcuate, uppermost edge as shown in Fig. 5. The innermost face of the lid or closure 22, is substantially complemental with the slot 12 and the ribs 28, there being a pair of spaced-apart, parallel grooves 30 formed in lid 22 coincident with ribs 28.

The parallel grooves 30 are divided by a rib 32 formed on the inner face of lid 22, said rib 32 being V-shaped in cross-section as shown in Fig. 5 and adapted for partial interpositioning within slot 12. It is noted that the rib 32 and the grooves 30 terminate inwardly from end 20 of lid 22.

The slot 12 slidably receives the shank portions 34 of a plurality of fishhooks 36. When the hooks 36 are so positioned upon the rack, arcuate portions 38 of hooks 36 are looped over corresponding ribs 28 and the barbed ends 40 of hooks 36 are positioned within the corresponding channel 26 of body member 10. A plurality of hooks 36 can thus be positioned in the rack in side-by-side relationship, whereupon the lid 22 is swung to the closed position with the grooved portions 30 thereof bearing against the arcuate parts 38 of hooks 36 and holding the same tightly against ribs 28. At the same time, the V-shaped rib 32 of lid 22 is positioned within the slot 12 between the two side-by-side rows of hooks 36, serving to hold the latter tightly within the body sections 14 and 16.

By virtue of forming the body 10 of resilient material such as plastic, the sections 14 and 16 will yield under pressure of the lid 22 as the rib 32 is forced into slot 12. The lid 22 is held clamped tightly against the hooks 36 by means of a split loop 42 that is adapted to slide over that end of the body 10 and the lid 22 opposite to the pivotal point 24. Loss of the locking means 42 is prevented by means of a chain 44 or the like inter-connecting loop 42 in body 10.

A modified form of hook for lid 22 is illustrated in Figs. 3, 4 and 5 and includes a clip broadly designated by the numeral 46. Clip 46 substantially closes the open ends of the channels 26 as shown in Fig. 4 and is provided with an L-shaped extension 48 disposed within a notch 50 of lid 22 and swingably mounted on a transverse pin 52.

Clip 46 is made from resilient material and has a pair of side wings 54 that yieldably grip the outermost faces of the sections 14 and 16. Likewise, a finger-grip 56 underlies the body 10 and yieldably engages the same when the clip 46 is in the closed position illustrated. Lid 22 may be opened by opening the clip 46 through grasping of either of the wings 54 or the grip 56. Clip 46 is advantageous over the loop 42 in that it serves to maintain any accidentally displaced fishhooks 36 within the rack when the same is in the closed position.

The modification illustrated in Figs. 6 and 7 is essentially the same as just above described in that the same includes a pair of body sections 100 and 102, each having a hook-receiving channel 104 comparable to channels 26 and divided by slot 106 similar to slot 12. The section 102 however, is provided with a bifurcated, innermost end 108 that is mounted for free swinging movement in the manner illustrated by dotted lines in Fig. 6 through the medium of a pin 110. Consequently, section 102 may be swung toward and away from the section 100 permitting hooks 36 to be individually moved from the rack as desired without necessitating the removal of a large number of hooks to obtain any particular one that may be desired.

It is clear that the fishhook rack above described in any of its modifications, may be conveniently used to support, store and transport a relatively large number of fishhooks of varying sizes. However, the rack may be advantageously placed in use for stringing of trotlines in the manner illustrated in Fig. 2, or otherwise as desired. There is illustrated fragmentarily, one side 58 of a boat having a perforated block 60 secured to the innermost face of side 58. Through use of the vertical perforation of block 60, the rack may be conveniently used by inserting the lid 22 thereof into such perforation and disposing the main body portion 10 thereof in an extended condition inside of the boat. When the hooks 36 are all joined to a single trotline in the usual manner, the fisherman may quickly and easily string the line by successively and individually moving the hooks 36 from the rack as the boat progresses slowly. In this manner the trotline can be easily set without danger of entanglement of the line or of the hooks thereof.

While several forms of the present invention have been illustrated, many additional changes might well be made within the spirit of the invention and, therefore, it is desired to be limited only by the scope of the appended claims.

Having thus described the invention, what is claimed as new and desired to be secured by Letters Patent is:

1. In a rack for a pair of rows of fishhooks of the kind having an elongated shank and an arcuate, barbed end, said rack including an elongated member having a longitudinally extending slot open at one end of the member, enclosed at the opposite end of the member and adapted to receive the shanks of said fishhooks, said member having an elongated channel in one face thereof on each side respectively of the said slot and coextensive in length therewith for receiving said ends of the fishhooks; a lid for the member having an elongated rib thereon adapted for wedging in the slot between the two rows of fishhooks; and means for holding the lid in an operating position on the member.

2. In a rack as set forth in claim 1 wherein said member is provided with a pair of relatively swingable sections each having one of said channels therein, the sections being spaced apart when swung together, presenting said slot therebetween.

WILLIAM G. GALBRAITH.
WILLIAM T. WILLIAMS.
CLYDE T. ABRAHAM.

REFERENCES CITED

The following references are of record in the file of this patent:

UNITED STATES PATENTS

| Number | Name | Date |
| --- | --- | --- |
| 2,447,105 | Vogel | Aug. 17, 1948 |
| 2,499,042 | Vogel | Feb. 28, 1950 |
| 2,531,643 | Pringle | Nov. 28, 1950 |